(12) United States Patent
Westlind (10) Patent No.: US 10,881,042 B1
(45) Date of Patent: Jan. 5, 2021

(54) AGRICULTURAL IMPLEMENT WITH A SCRAPER INTERNAL TO A ROLLING BASKET

(71) Applicant: Summers Manufacturing Company, Inc., Devils Lake, ND (US)

(72) Inventor: Travis E. Westlind, Hampden, ND (US)

(73) Assignee: Summers Manufacturing Company, Inc., Devils Lake, ND (US)

( * ) Notice: Subject to any disclaimer, the term of this patent is extended or adjusted under 35 U.S.C. 154(b) by 119 days.

(21) Appl. No.: 16/367,947

(22) Filed: Mar. 28, 2019

Related U.S. Application Data (60) Continuation of application No. 15/871,327, filed on Jan. 15, 2018, now Pat. No. 10,251,322, which is a continuation of application No. 15/289,670, filed on Oct. 10, 2016, now Pat. No. 9,867,321, which is a continuation of application No. 15/088,704, filed on Apr. 1, 2016, now Pat. No. 9,462,737, which is a division of application No. 14/154,657, filed on Jan. 14, 2014, now Pat. No. 9,326,439.

(Continued)

(51) Int. Cl.
*A01B 27/00* (2006.01)
*A01B 29/04* (2006.01)
*A01B 33/14* (2006.01)

(52) U.S. Cl.
CPC ............ *A01B 29/048* (2013.01); *A01B 27/00* (2013.01); *A01B 27/005* (2013.01); *A01B 29/04* (2013.01); *A01B 33/142* (2013.01); *Y10T 29/27* (2015.01)

(58) Field of Classification Search
CPC ...... A01B 27/00; A01B 27/005; A01B 29/048
See application file for complete search history.

(56) References Cited

U.S. PATENT DOCUMENTS

| | | | |
|---|---|---|---|
| 1,249,103 A | 12/1917 | Jansky | |
| 2,582,199 A | 1/1952 | Gardner | |

(Continued)

FOREIGN PATENT DOCUMENTS

| | | |
|---|---|---|
| AT | 407817 B | 6/2001 |
| CN | 201563348 U | 9/2010 |

(Continued)

OTHER PUBLICATIONS

Standard Alloway Seedbetter Operator's Manual; Feb. 2010.

*Primary Examiner* — Gary S Hartmann
(74) *Attorney, Agent, or Firm* — Neustel Law Offices (57) ABSTRACT

An agricultural implement having a rolling basket which includes a plurality of elongated members arranged in a substantially cylindrical shape. A stationary internal scraper is disposed in the inner chamber of the rolling basket and is adapted for breaking up a material from the inner chamber as the rolling basket is rotated around the major axis of rotation of the rolling basket. The internal scraper extends in an upward direction with respect to the major axis of rotation of the rolling basket with the upper edge of the internal scraper distally spaced away from and above the major axis of rotation of the rolling basket and with the lower edge of the internal scraper distally spaced away from and above the major axis of rotation of the rolling basket. The upper edge of the internal scraper is positioned above the lower edge.

103 Claims, 5 Drawing Sheets

Related U.S. Application Data (60) Provisional application No. 62/759,048, filed on Jan. 31, 2013.

(56) References Cited

U.S. PATENT DOCUMENTS

| | | | |
|---|---|---|---|
| 2,911,893 | A | 11/1959 | Archibald |
| 3,269,285 | A | 8/1966 | Lathers |
| 3,392,791 | A | 7/1968 | Orthman |
| 3,714,913 | A | 2/1973 | Gandrud |
| 3,897,830 | A | 8/1975 | van der Lely |
| 3,910,712 | A | 10/1975 | Guerin |
| 4,145,823 | A | 3/1979 | Lucas |
| 4,342,365 | A | 8/1982 | van der Lely |
| 4,374,546 | A | 2/1983 | Mitchell |
| 4,610,567 | A | 9/1986 | Hosking |
| 4,919,211 | A | 4/1990 | Cope |
| 5,632,343 | A | 5/1997 | Gengler |
| 7,143,837 | B2 | 12/2006 | Dietrich, Sr. |
| 9,326,439 | B2 | 5/2016 | Westlind |
| 9,462,737 | B2 | 10/2016 | Westlind |
| 9,462,739 | B2 * | 10/2016 | Naylor ................ A01B 73/046 |
| 9,867,321 | B2 | 1/2018 | Westlind |
| 10,251,322 | B2 * | 4/2019 | Westlind .............. A01B 33/142 |
| 2003/0196823 | A1 | 10/2003 | McDonald |
| 2013/0062084 | A1 | 3/2013 | Casper |
| 2014/0262379 | A1 | 9/2014 | Landoll |

FOREIGN PATENT DOCUMENTS

| | | |
|---|---|---|
| DE | 7812988 U1 | 9/1978 |
| EP | 1639876 B1 | 5/2008 |
| FR | 2488768 | 2/1982 |
| FR | 2586887 A1 | 3/1987 |
| FR | 2804575 | 8/2001 |
| GB | 2145913 A | 4/1985 |
| JP | 2010094036 A | 4/2010 |
| JP | 2010200665 A | 9/2010 |
| RU | 2233571 | 8/2004 |

* cited by examiner

AGRICULTURAL IMPLEMENT WITH A SCRAPER INTERNAL TO A ROLLING BASKET

CROSS REFERENCE TO RELATED APPLICATIONS

The present application is a continuation of U.S. application Ser. No. 15/871,327 filed on Jan. 15, 2018 which issues as U.S. Pat. No. 10,251,322 on Apr. 9, 2019, which is a continuation of U.S. application Ser. No. 15/289,670 filed on Oct. 10, 2016 now issued as U.S. Pat. No. 9,867,321, which is a continuation of U.S. application Ser. No. 15/088,704 filed on Apr. 1, 2016 now issued as U.S. Pat. No. 9,462,737, which is a divisional of U.S. application Ser. No. 14/154,657 filed on Jan. 14, 2014 now issued as U.S. Pat. No. 9,326,439, which claims priority to U.S. Provisional Application No. 61/759,048 filed Jan. 31, 2013. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

FIELD

This disclosure generally relates to a rolling basket for an agricultural tillage implement for crumbling soil for agricultural use.

BACKGROUND

An agricultural tillage implement for crumbling soil can include one or more rolling baskets. A rolling basket is commonly disposed and connected at a rear of an agricultural tillage implement for crumbling soil, firming up the soil profile, breaking up clods of soil, and/or enhance the seed bed.

SUMMARY

An agricultural tillage implement having a rolling basket is disclosed. One or more of the rolling baskets can be attached at an end of the agricultural tillage implement after rows of disk coulters. The rolling basket functions to break up clumps of dirt.

A stationary blade is disposed inside an inner chamber of the rolling basket and attached at ends of the rolling basket near the bearings connected to the rolling basket. The rolling basket rotates around its major axis via the bearings, while the blade is held stationary. The stationary blade has sleeves at the ends, and each of the sleeves is connected to a post of a support arm and locked into the posts via a pin. The stationary blade can be a part of an internal scraper disposed inside an inner chamber of the rolling basket.

BRIEF DESCRIPTION OF THE DRAWINGS

Referring now to the drawings in which like reference numbers represent corresponding parts throughout.

DETAILED DESCRIPTION

The term "rolling basket" generally refers to a "basket roller" as used by American Society of Agricultural Engineers (ASAE) Standard Terminology and Definitions for Agricultural Tillage Implements. A rolling basket is assembled and connected to be a part of an agricultural tillage implement. The agricultural tillage implement can have one or more rolling baskets assembled thereto.

It has been discovered that conventional rolling baskets are prone to plugging in muddy or moist conditions. The present invention solves the plugging problem with an internal scraper in the rolling basket. The internal scraper (e.g. stationary blade) disrupts the flow of mud inside the inner chamber of the rolling basket. That is, the internal scraper prevents the mud from pushing into the center of the inner chamber of the rolling basket which otherwise tends to fill up the rolling basket.

Figure 1:
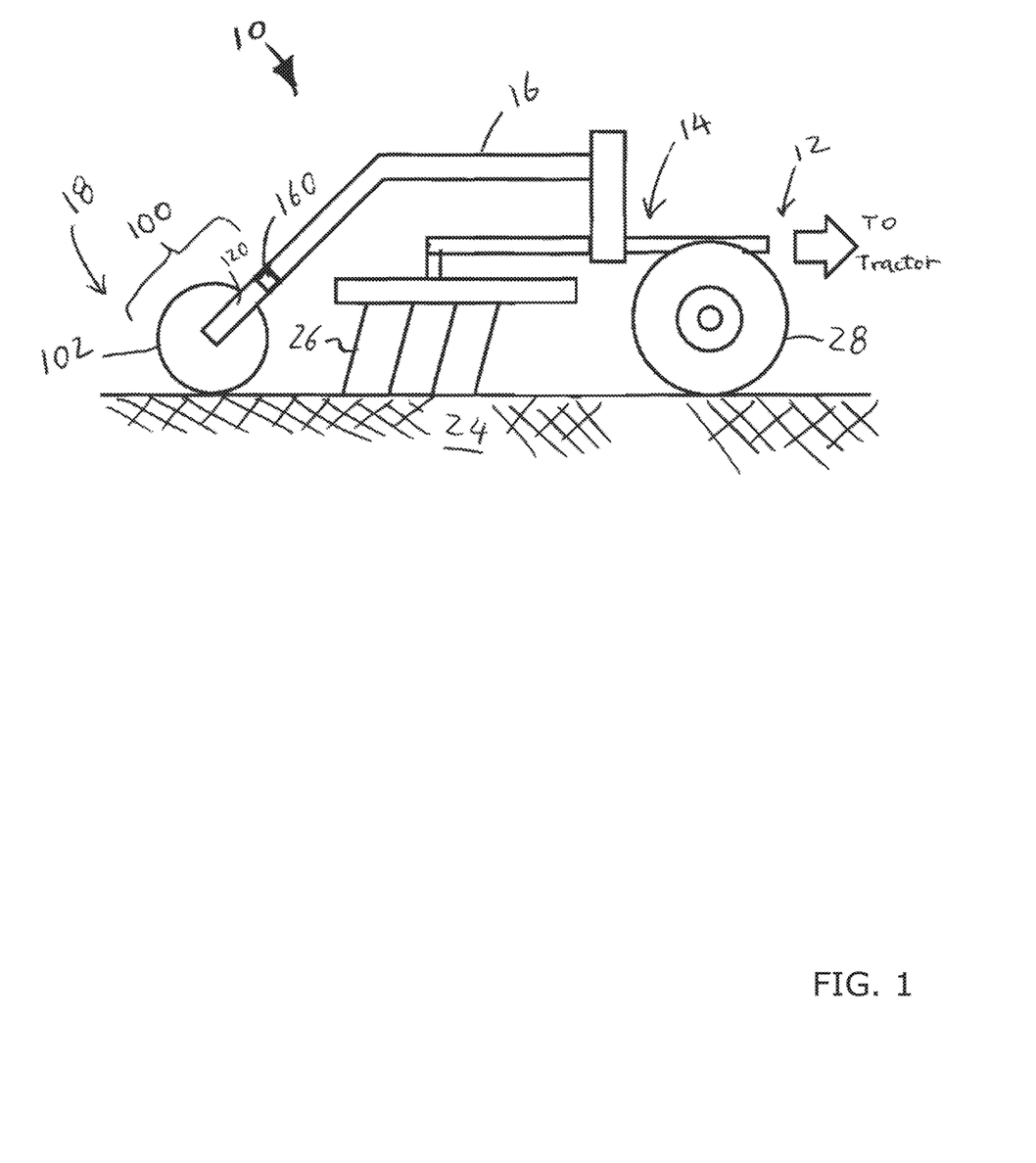
FIG. 1 illustrates a side schematic view of an embodiment of an agricultural tillage implement.

FIG. 1 shows an embodiment of an agricultural tillage implement 10, having a front 12 that is configured to connect to a puller (e.g. a tractor) (see arrow). The agricultural tillage implement 10 includes a tillage equipment assembly 14 and a support member 16, wherein the support member 16 is directed towards a rear 18 of the agricultural implement 10 and the support member 16 is connected to and supports a rolling basket assembly 100, which includes one or more rolling basket 102 connected to a support arm 120 connected to a support bar 160. The tillage equipment assembly 14 has a frame 20 and various tillage equipment attached to the frame 20. The tillage equipment assembly 14 can have one or more tillage equipment connected and assembled thereto. The tillage equipment assembly 14 which can include a harrow. The harrow can be, for example, a disk harrow, single disk harrow, a tandem disk harrow, an offset disk harrow, and/or a one-way disk harrow. FIG. 1 shows the tillage equipment assembly 14 including a plurality of teeth 26 for mixing and leveling the soil surface. The teeth 26 can be round-wire teeth, spike teeth, and/or spring teeth. Further, although not shown, the agricultural tillage implement 10 can include one or more plows, such as a chisel plow, a moldboard plow, a disk plow, a combination chisel plow, a subsoiler, a field cultivator, a row bedder, and/or a row crop cultivator. Further, although not shown, the tillage equipment assembly 14 can include a vertical tillage disc. The frame 20 includes wheels 28 to support the agricultural tillage implement 10 on the ground. The wheels 28 can be used to control a digging depth of the agricultural equipment (e.g. harrow 22 and/or teeth 26).

Figure 2:
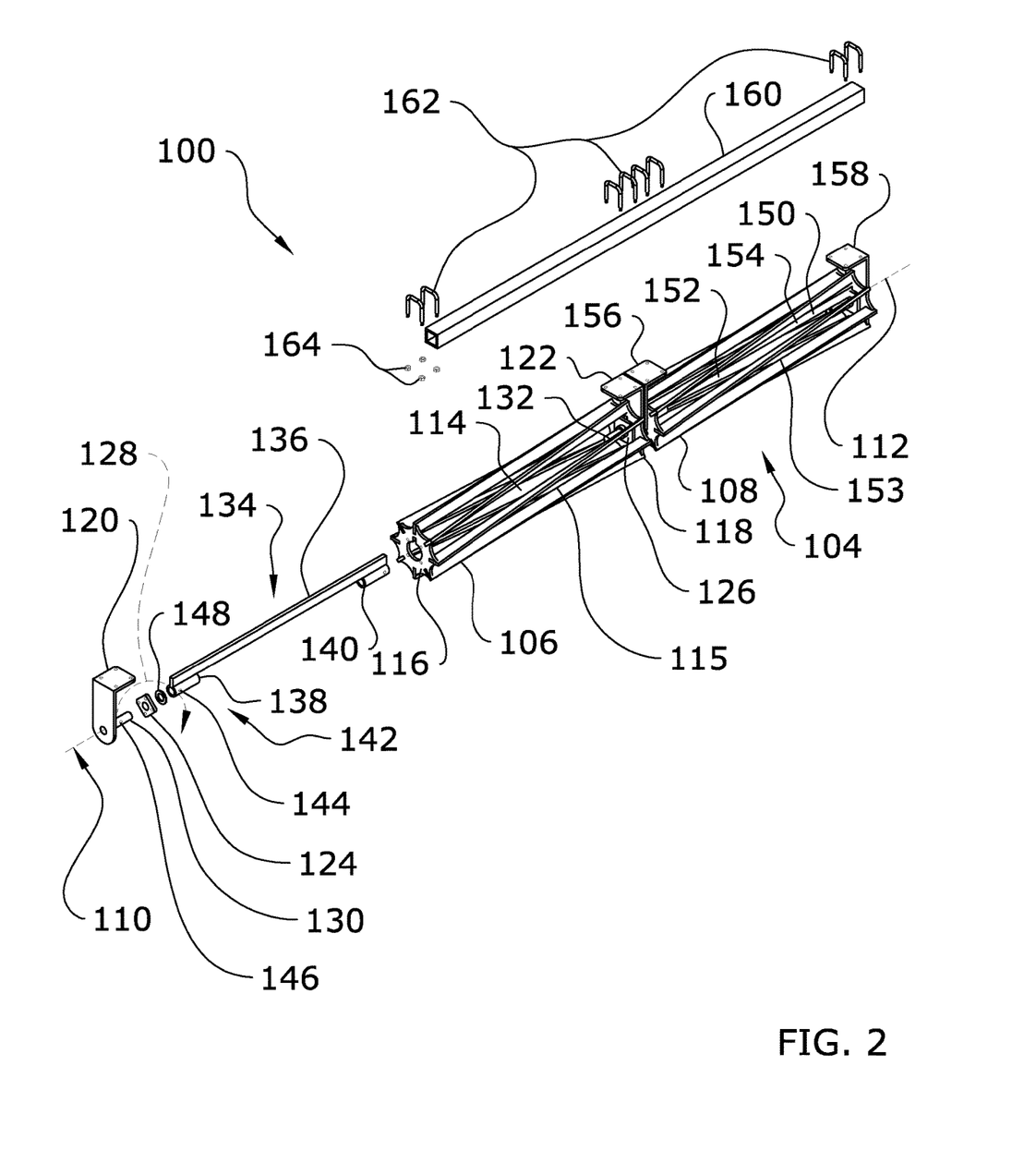
FIG. 2 illustrates a partially exploded perspective view of an embodiment of an agricultural tillage implement assembly having two rolling baskets.

FIG. 2 shows an embodiment of a rolling basket assembly 100 for an agricultural tillage implement (10 shown in FIG. 1) including two rolling baskets 102, 104. Each of the rolling baskets 102, 104 has a generally cylindrical shape formed by a plurality of blades 106, 108. In other embodiments, one or more of the blades 106, 108 can be replaced with wire rods or bars. The plurality of blades 106, 108 of the rolling basket 102, 104 extend from near one end along a major axis 110, 112 of the rolling basket 102, 104 to an opposing end of the major axis 110, 112, respectively. The rolling basket assembly 100 has the two rolling baskets 102, 104 aligned so that the each of the major axis 110, 112 are aligned and/or parallel to each other.

The rolling basket 102 has the plurality blades 106 disposed generally evenly spaced around a circumference defined by a fixed radius away from the major axis 110 thereby forming a "basket" structure. The basket structure defines an inner chamber 114 of the rolling basket 102. The basket structure has a plurality of openings 115 connecting the inner chamber 114 to the outside of the basket structure. The plurality of blades 106 can be straight or curved (e.g. helical) as they extend axially from one end 116 of the rolling basket 102 to an opposing end 118. When in use, the rolling basket 102 is positioned on the ground so that its major axis 110 is substantially parallel with a surface of the ground, and the plurality of blades 106 rotate around the major axis 110 to work the soil.

The rolling basket 102 is connected to two support arms 120, 122 via bearings 124, 126. The bearings 124, 126 are connected to the rolling basket 102 at ends 116, 118 of the rolling basket. The bearings 124, 126 are configured to allow the rolling basket 102 to rotate around its major axis 110 (as shown by, for example, arrow 128). The arrow 128 is not intended to limit a direction of the rotation of the rolling basket 102. Accordingly, the rolling basket 102 can rotate in either direction of the arrow 128.

The support arm 120 has a post 130 configured to connect to the bearing 124. The bearing 124 is configured to rotate around the post 130. The support arm 122 also has a post 132 configured to connect to the bearing 126, wherein the bearing 126 is configured to rotate around that post 132. Thus, the rolling basket 102, which is connected to the bearings 124, 126 rotates around the posts 130, 132.

In the embodiment shown, an axial shaft for rotating the rolling basket 102 is not included in the rolling basket 102. An internal scraper 134 includes a stationary blade 136 connected to two sleeves 138, 140 at each end of the stationary blade 136. The first sleeve 138 receives the post 130. A pin 142 can be inserted into matching openings 144, 146 to lock the first sleeve 138 stationary with respect to the post 130. The opening 144 is in the first sleeve 138 and the opening 146 is in the post 130. The bearing 124 is disposed between the support arm 120 and the first sleeve 138 on the post 130. A washer 148 can be provided between the bearing 124 and the first sleeve 138 to aid in rotation of the bearing 124 with respect to the first sleeve 138.

Similar to the configuration of the first sleeve 138, the second sleeve 140 receives the post 132. A pin is inserted into matching openings of the second sleeve 140 and the post 132 to hold the second sleeve 140 stationary with respect to the post 132. The bearing 126 is disposed between the support arm 122 and the second sleeve 140 on the post 132. A washer can be provided between the bearing 126 and the second sleeve 140 to aid in rotation of the bearing 126 with respect to the second sleeve 140.

The first sleeve 138 and the second sleeve 140 are configured to make the internal scraper 134 stationary when the rolling basket 102 is rotating (i.e. during operation of the rolling basket 102). Accordingly, in addition to the pins 142 and/or as an alternative, each of the first sleeve 138 and the second sleeve 140 can have a locking structure that make the sleeves 138, 140 stationary with respect to the to the respective posts 130, 132.

Figure 4:
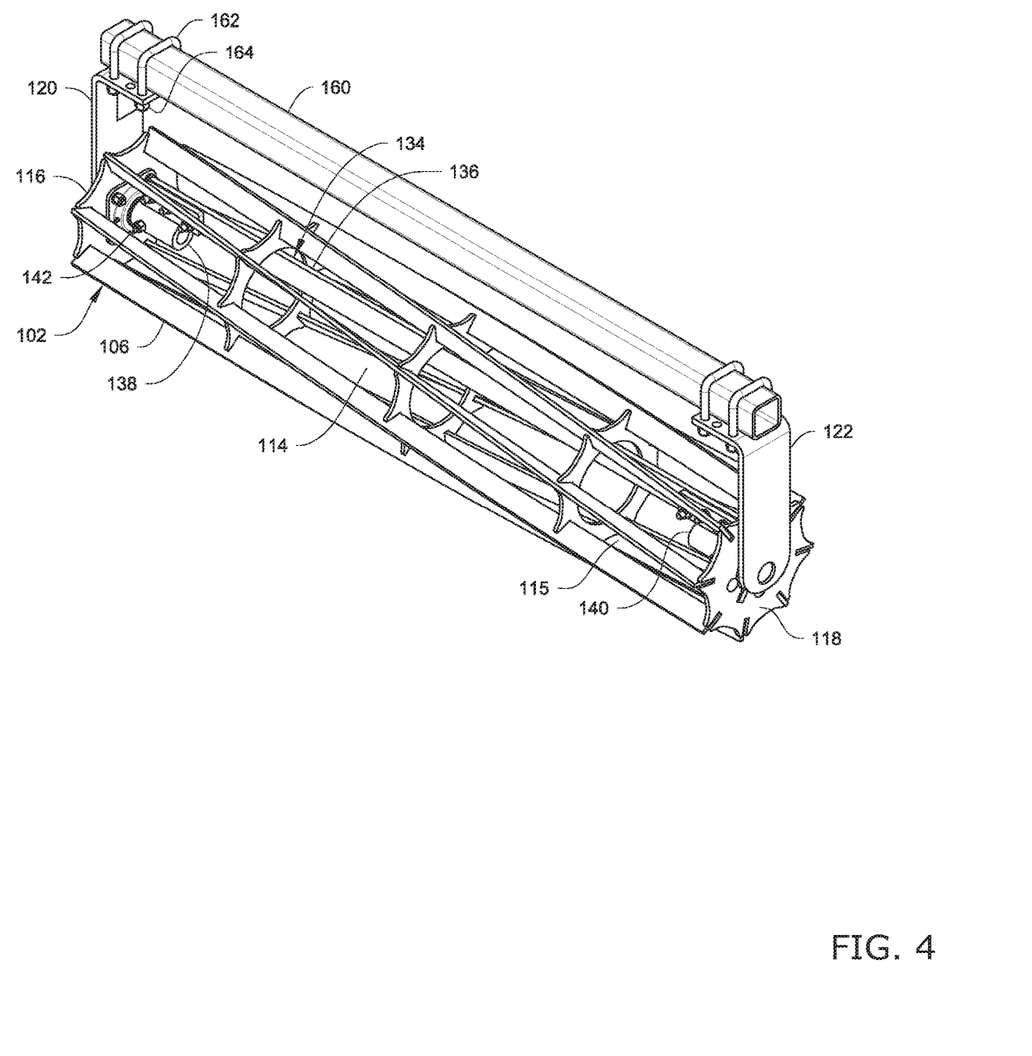
FIG. 4 is a perspective view showing the implement in assembled form.
Figure 5:
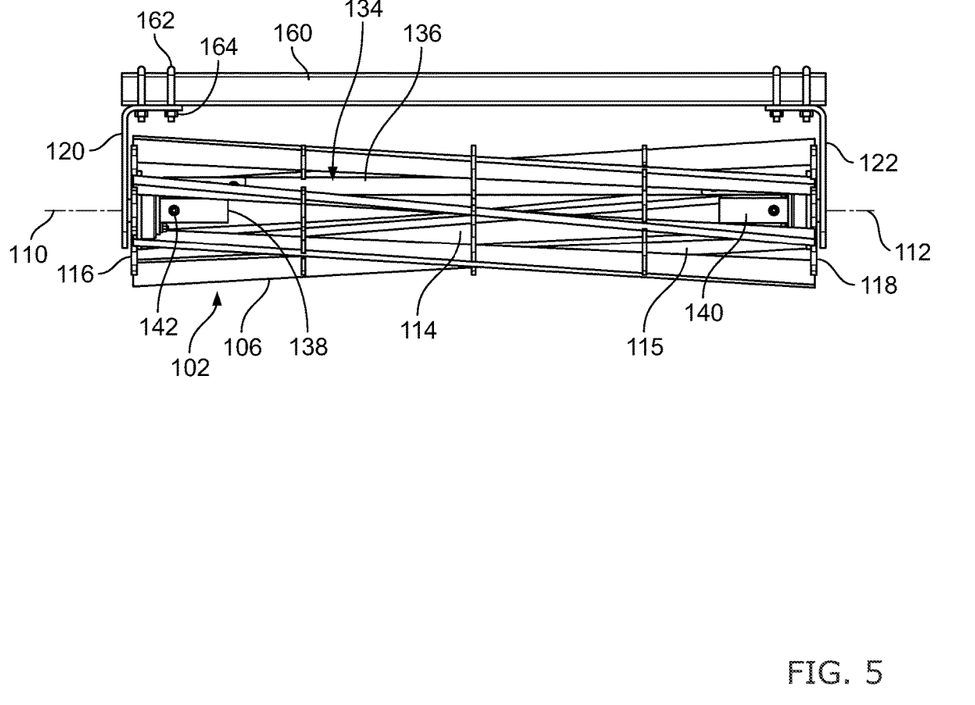
FIG. 5 is a frontal view showing the implement in assembled form.

The rolling basket 104 is assembled similarly to the rolling basket 102. Fully assembled, the internal scraper 150 is disposed inside the inner chamber 152 of the rolling basket 104 as shown in FIG. 4. The rolling basket 104 has openings 153 connecting the inner chamber 152 to the outside of the rolling basket 104. The stationary blade 154 of the internal scraper 150 extends radially away from the major axis 110, 112 of the rolling basket 104 as shown in FIG. 5. The rolling basket 104 has the stationary blade 154 extending vertically in the "up" direction, away from the surface of the ground. The internal scraper 150 is connected to the support arms 156, 158 and is held stationary with respect to the rotating blades 108. The rolling basket 104 is connected to bearings at each ends, similarly to the rolling basket 102 described above.

In other embodiments, the stationary blade may extend in other directions with respect to the surface of the ground. The stationary blade is never extended "down" towards the surface of the ground. The support arms 120, 122, 156, 158 are connected to a support bar, i.e. a horizontal bar via, for example, a plurality of pins 162 (e.g. U-bolt) and nuts 164. The pins 162 are inserted through openings in an upper base portion of the support arms 120, 122, 156, 158 and the nuts 164 engage the pins 162 from the bottom of the upper base portion. Other means of connecting the support arms 120, 122, 156, 158 are possible.

The internal scrapers 134, 150 are fixedly positioned so that they do not rotate around the major axis 110, 112 when the rolling baskets 102, 104 rotate around their major axis 110, 112. Accordingly, when large pieces of material are introduced into the inner chambers 114, 152 the large pieces will move towards the internal scrapers 134, 150 by the rotating motion of the rolling baskets 102, 104. As the rolling baskets 102, 104 rotate, material inside the inner chamber of the rolling baskets 102, 104 may move up (e.g. away from the ground) with the rotating motion. As the material reaches the top of the rolling baskets 102, 104, the internal scrapers 134, 150 make contact with the material and prevent the material from moving along with the rotation of the rolling baskets 102, 104. Thus, the internal scrapers 134, 150 provide resistive force for the materials. The resistive force provided by the internal scrapers 134, 150 prevents the materials from rotating with the rolling baskets 102, 104. Accordingly, the materials disconnect from the rolling baskets 102, 104 and then with the aid of gravity, fall down towards the direction of the ground. The materials can contact the rotating blades 106, 108 as they fall down and this contact can help in breaking down the materials to smaller sizes. Then, the materials are discharged (i.e. removed) via one of the openings 115 of the rolling baskets 102, 104.

Figure 3:
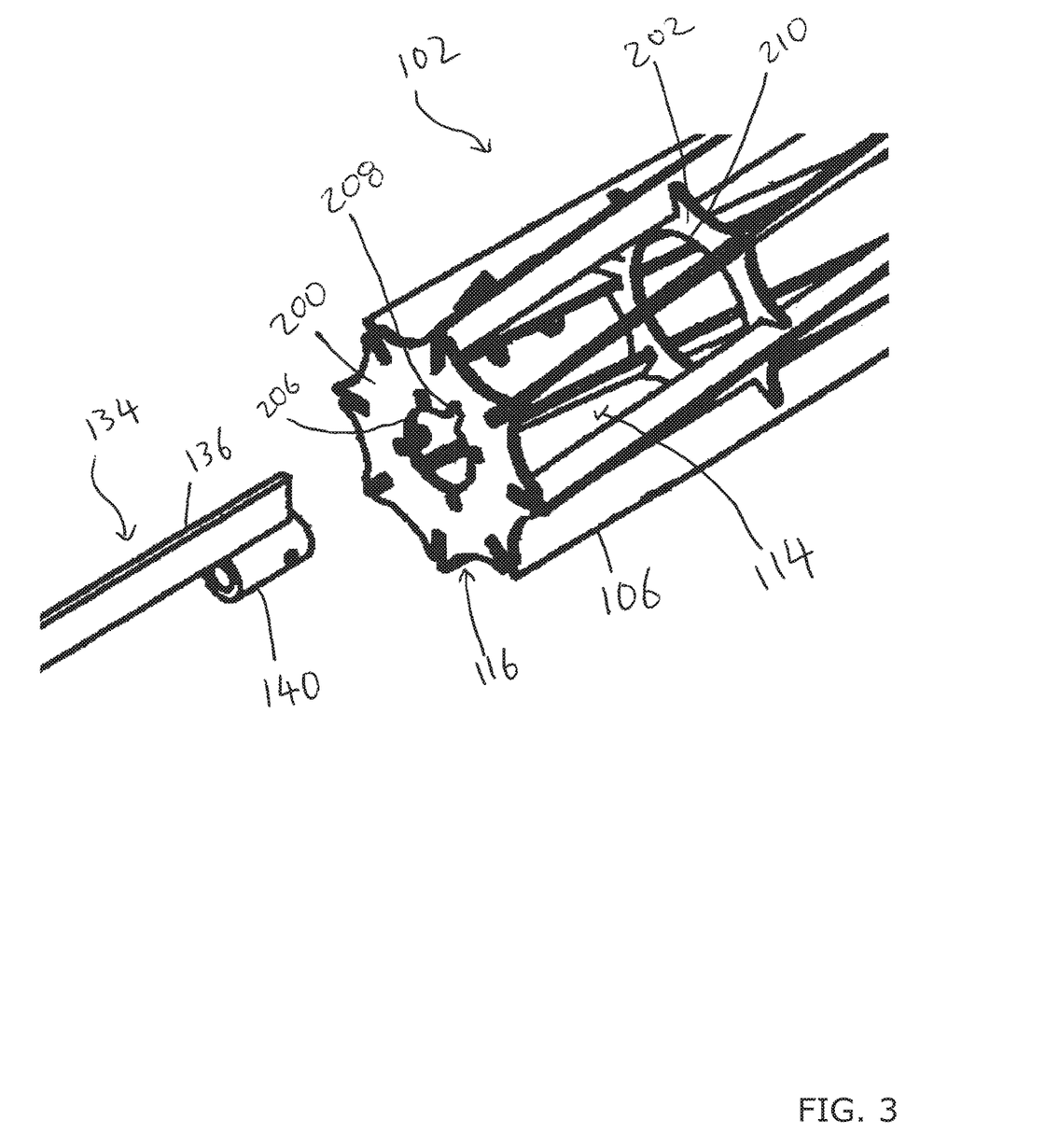
FIG. 3 illustrates a close-up view of one of the rolling baskets shown in FIG. 2.

FIG. 3 illustrates a close-up view of a portion of the FIG. 2, near an end 116 of the rolling basket 102. The rolling basket 102 includes the plurality of blades 106 defining the inner chamber 114 of the basket structure defined by the plurality of blades 106. The plurality of blades 106 are connected to an outer ring plate 200 and an inner ring plate 202. The outer ring plate 200 is located at the end 116 of the rolling basket 102 and includes a central opening 206 with a notch 208 extending in a radial direction away from a center of the outer ring plate 200. The central opening 206 receives the sleeve 140 of the internal scraper 134 and the notch 208 receives the stationary blade 136 of the internal scraper 134 during assembly, so that the internal scraper 134 can be disposed inside the inner chamber 114 of the rolling basket 102. The inner ring plate 202 has an inner opening 210 that has a larger diameter than the central opening 206. Preferably, the inner opening 210 has a radius that is substantially the same as a radial distance of the notch 208. Thus, the inner opening 210 allows the rolling basket 102 to rotate around the stationary blade 136 without the inner ring plate 202 directly contacting the stationary blade 136.

Advantageously, a rolling basket having an internal scraper can prevent materials from getting stuck in the basket structure of the rolling basket. This can improve performance of the rolling basket (and agricultural implements that include the rolling basket). Further, the rolling basket having an internal scraper can prevent and/or reduce damage to the equipment by aiding in breaking apart large materials that can get otherwise stuck in the inner chamber of the rolling basket. With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. An agricultural implement, comprising:
    a rolling basket comprising a plurality of elongated members, wherein the rolling basket is adapted to rotate around a major axis of rotation of the rolling basket, wherein the plurality of elongated members define an inner chamber of the rolling basket; and
    an internal scraper disposed in the inner chamber of the rolling basket adapted for breaking up a material from the inner chamber as the rolling basket is rotated around the major axis of rotation of the rolling basket, wherein the internal scraper is stationary relative to the rolling basket as the rolling basket rotates;
    wherein the internal scraper includes an upper edge and a lower edge;
    wherein the internal scraper extends in an upward direction with respect to the major axis of rotation of the rolling basket;
    wherein the upper edge of the internal scraper is distally spaced away from the major axis of rotation of the rolling basket;
    wherein the upper edge of the internal scraper is positioned above the major axis of rotation of the rolling basket;
    wherein the lower edge of the internal scraper is distally spaced away from the major axis of rotation of the rolling basket;
    wherein the lower edge of the internal scraper is positioned above the major axis of rotation of the rolling basket; and
    wherein the upper edge of the internal scraper is positioned above the lower edge of the internal scraper.

2. The agricultural implement of claim 1, wherein the plurality of elongated members are each comprised of a rod.

3. The agricultural implement of claim 1, wherein the plurality of elongated members are each comprised of a blade.

4. The agricultural implement of claim 1, wherein the plurality of elongated members are each comprised of a bar.

5. The agricultural implement of claim 1, wherein the plurality of elongated members extend from a first end to a second end of the rolling basket.

6. The agricultural implement of claim 1, wherein the plurality of elongated members are parallel to the major axis of rotation of the rolling basket.

7. The agricultural implement of claim 1, wherein the plurality of elongated members are evenly spaced around a circumference of the rolling basket at a fixed radius away from the major axis.

8. The agricultural implement of claim 1, wherein the plurality of elongated members are straight.

9. The agricultural implement of claim 1, wherein the plurality of elongated members are curved.

10. The agricultural implement of claim 1, wherein the plurality of elongated members are helical.

11. The agricultural implement of claim 1, wherein the internal scraper extends along an axis which is offset with respect to the major axis of rotation of the rolling basket.

12. The agricultural implement of claim 1, wherein the rolling basket comprises a first end and a second end, wherein the internal scraper is connected between the first end and the second end of the rolling basket.

13. The agricultural implement of claim 1, wherein the rolling basket comprises a first end and a second end, wherein the internal scraper extends between the first end and the second end of the rolling basket.

14. The agricultural implement of claim 1, further comprising a first sleeve connecting the internal scraper to a first support arm and a second sleeve connecting the internal scraper to a second support arm such that the internal scraper does not rotate with the rolling basket.

15. The agricultural implement of claim 1, wherein a first end of the rolling basket comprises a first outer ring plate and wherein a second end of the rolling basket comprises a second outer ring plate, and including a first bearing connected between the first support arm and the first outer ring plate and a second bearing connected between the second support arm and the second outer ring plate.

16. The agricultural implement of claim 1, wherein the internal scraper comprises a first sleeve positioned at a first end of the internal scraper and a second sleeve positioned at a second end of the internal scraper for connecting the internal scraper to the rolling basket in a non-rotational manner.

17. The agricultural implement of claim 16, wherein the internal scraper extends upwardly from the first sleeve and the second sleeve.

18. The agricultural implement of claim 1, wherein the upper edge of the internal scraper is positioned near an inner edge of the plurality of elongated members.

19. The agricultural implement of claim 1, wherein the internal scraper extends radially away from the major axis of rotation.

20. The agricultural implement of claim 1, wherein the internal scraper extends vertically.

21. The agricultural implement of claim 1, wherein the internal scraper is comprised of a stationary blade.

22. The agricultural implement of claim 1, wherein the rolling basket is connected to a pair of support arms.

23. The agricultural implement of claim 22, including a pair of bearings connected to the rolling basket and the pair of support arms.

24. The agricultural implement of claim 22, wherein the internal scraper is connected to the support arms and held stationary with respect to the plurality of elongated members.

25. An agricultural implement, comprising:
    a rolling basket comprising a first end and a second end, wherein the rolling basket comprises a plurality of elongated members, wherein the rolling basket is adapted to rotate around a major axis of rotation of the rolling basket, wherein the plurality of elongated members define an inner chamber of the rolling basket; and
    an internal scraper disposed in the inner chamber of the rolling basket adapted for breaking up a material from the inner chamber as the rolling basket is rotated around the major axis of rotation of the rolling basket, wherein the internal scraper includes an upper edge and a lower edge, wherein the internal scraper extends in an upward direction with respect to the major axis of rotation of the rolling basket, wherein the internal scraper is stationary relative to the rolling basket as the rolling basket rotates, wherein the internal scraper extends between the first end and the second end of the rolling basket, wherein the internal scraper extends along an axis which is offset with respect to the major axis of rotation of the rolling basket, wherein the upper edge of the internal scraper is distally spaced away from the major axis of rotation of the rolling basket, the upper edge of the internal scraper is positioned near an inner edge of the plurality of elongated members, wherein the upper edge of the internal scraper is positioned above the major axis of rotation of the rolling basket, wherein the lower edge of the internal scraper is distally spaced away from the major axis of rotation of the rolling basket, wherein the lower edge of the internal scraper is positioned above the major axis of rotation of the rolling basket, and wherein the upper edge of the internal scraper is positioned above the lower edge of the internal scraper.

26. The agricultural implement of claim 25, wherein the plurality of elongated members are each comprised of a rod.

27. The agricultural implement of claim 25, wherein the plurality of elongated members are each comprised of a blade.

28. The agricultural implement of claim 25, wherein the plurality of elongated members are each comprised of a bar.

29. The agricultural implement of claim 25, wherein the plurality of elongated members extend from a first end to a second end of the rolling basket.

30. The agricultural implement of claim 25, wherein the plurality of elongated members are parallel to the major axis of rotation of the rolling basket.

31. The agricultural implement of claim 25, wherein the plurality of elongated members are evenly spaced around a circumference of the rolling basket at a fixed radius away from the major axis.

32. The agricultural implement of claim 25, wherein the plurality of elongated members are straight.

33. The agricultural implement of claim 25, wherein the plurality of elongated members are curved.

34. The agricultural implement of claim 25, wherein the plurality of elongated members are helical.

35. The agricultural implement of claim 25, wherein the internal scraper is connected between the first end and the second end of the rolling basket.

36. The agricultural implement of claim 25, further comprising a first sleeve connecting the internal scraper to a first support arm and a second sleeve connecting the internal scraper to a second support arm such that the internal scraper does not rotate with the rolling basket.

37. The agricultural implement of claim 25, wherein the first end of the rolling basket comprises a first outer ring plate and wherein the second end of the rolling basket comprises a second outer ring plate, and including a first bearing connected between the first support arm and the first outer ring plate and a second bearing connected between the second support arm and the second outer ring plate.

38. The agricultural implement of claim 25, wherein the internal scraper comprises a first sleeve positioned at a first end of the internal scraper and a second sleeve positioned at a second end of the internal scraper for connecting the internal scraper to the rolling basket in a non-rotational manner.

39. The agricultural implement of claim 38, wherein the internal scraper extends upwardly from the first sleeve and the second sleeve.

40. The agricultural implement of claim 25, wherein the upper edge of the internal scraper is positioned near an inner edge of the plurality of elongated members.

41. The agricultural implement of claim 25, wherein the internal scraper extends radially away from the major axis of rotation.

42. The agricultural implement of claim 25, wherein the internal scraper extends vertically.

43. The agricultural implement of claim 25, wherein the internal scraper is comprised of a stationary blade.

44. The agricultural implement of claim 25, wherein the rolling basket is connected to a pair of support arms.

45. The agricultural implement of claim 44, including a pair of bearings connected to the rolling basket and the pair of support arms.

46. The agricultural implement of claim 44, wherein the internal scraper is connected to the support arms and held stationary with respect to the plurality of elongated members.

47. An agricultural implement, comprising:
 a rolling basket comprising a plurality of elongated members, wherein the rolling basket is adapted to rotate around a major axis of rotation of the rolling basket, wherein the plurality of elongated members define an inner chamber of the rolling basket; and
 an internal scraper disposed in the inner chamber of the rolling basket adapted for breaking up a material from the inner chamber as the rolling basket is rotated around the major axis of rotation of the rolling basket, wherein the internal scraper is stationary relative to the rolling basket as the rolling basket rotates;
 wherein the internal scraper includes an upper edge and a lower edge;
 wherein the internal scraper extends at an upward angle with respect to the surface of the ground;
 wherein the upper edge of the internal scraper is distally spaced away from the major axis of rotation of the rolling basket;
 wherein the upper edge of the internal scraper is positioned above the major axis of rotation of the rolling basket;
 wherein the lower edge of the internal scraper is distally spaced away from the major axis of rotation of the rolling basket;
 wherein the lower edge of the internal scraper is positioned above the major axis of rotation of the rolling basket; and
 wherein the upper edge of the internal scraper is positioned above the lower edge of the internal scraper.

48. The agricultural implement of claim 47, wherein the plurality of elongated members are each comprised of a rod.

49. The agricultural implement of claim 47, wherein the plurality of elongated members are each comprised of a blade.

50. The agricultural implement of claim 47, wherein the plurality of elongated members are each comprised of a bar.

51. The agricultural implement of claim 47, wherein the plurality of elongated members extend from a first end to a second end of the rolling basket.

52. The agricultural implement of claim 47, wherein the plurality of elongated members are parallel to the major axis of rotation of the rolling basket.

53. The agricultural implement of claim 47, wherein the plurality of elongated members are evenly spaced around a circumference of the rolling basket at a fixed radius away from the major axis.

54. The agricultural implement of claim 47, wherein the plurality of elongated members are straight.

55. The agricultural implement of claim 47, wherein the plurality of elongated members are curved.

56. The agricultural implement of claim 47, wherein the plurality of elongated members are helical.

57. The agricultural implement of claim 47, wherein the internal scraper extends along an axis which is offset with respect to the major axis of rotation of the rolling basket.

58. The agricultural implement of claim 47, wherein the rolling basket comprises a first end and a second end, wherein the internal scraper is connected between the first end and the second end of the rolling basket.

59. The agricultural implement of claim 47, wherein the rolling basket comprises a first end and a second end, wherein the internal scraper extends between the first end and the second end of the rolling basket.

60. The agricultural implement of claim 47, further comprising a first sleeve connecting the internal scraper to a first support arm and a second sleeve connecting the internal scraper to a second support arm such that the internal scraper does not rotate with the rolling basket.

61. The agricultural implement of claim 47, wherein a first end of the rolling basket comprises a first outer ring plate and wherein a second end of the rolling basket comprises a second outer ring plate, and including a first bearing connected between the first support arm and the first outer ring plate and a second bearing connected between the second support arm and the second outer ring plate.

62. The agricultural implement of claim 47, wherein the internal scraper comprises a first sleeve positioned at a first end of the internal scraper and a second sleeve positioned at a second end of the internal scraper for connecting the internal scraper to the rolling basket in a non-rotational manner.

63. The agricultural implement of claim 62, wherein the internal scraper extends upwardly from the first sleeve and the second sleeve.

64. The agricultural implement of claim 47, wherein the upper edge of the internal scraper is positioned near an inner edge of the plurality of elongated members.

65. The agricultural implement of claim 47, wherein the internal scraper extends radially away from the major axis of rotation.

66. The agricultural implement of claim 47, wherein the internal scraper extends vertically.

67. The agricultural implement of claim 47, wherein the internal scraper is comprised of a stationary blade.

68. The agricultural implement of claim 47, wherein the rolling basket is connected to a pair of support arms.

69. The agricultural implement of claim 68, including a pair of bearings connected to the rolling basket and the pair of support arms.

70. The agricultural implement of claim 68, wherein the internal scraper is connected to the support arms and held stationary with respect to the plurality of elongated members.

71. An agricultural implement, comprising:
a rolling basket comprising a plurality of elongated members, wherein the rolling basket is adapted to rotate around a major axis of rotation of the rolling basket, wherein the plurality of elongated members define an inner chamber of the rolling basket; and
an internal scraper disposed in the inner chamber of the rolling basket adapted for breaking up a material from the inner chamber as the rolling basket is rotated around the major axis of rotation of the rolling basket, wherein the internal scraper is stationary relative to the rolling basket as the rolling basket rotates;
wherein the internal scraper includes an upper edge and a lower edge;
wherein the internal scraper does not extend downwardly;
wherein the upper edge of the internal scraper is distally spaced away from the major axis of rotation of the rolling basket;
wherein the upper edge of the internal scraper is positioned above the major axis of rotation of the rolling basket;
wherein the lower edge of the internal scraper is distally spaced away from the major axis of rotation of the rolling basket;
wherein the lower edge of the internal scraper is positioned above the major axis of rotation of the rolling basket; and
wherein the upper edge of the internal scraper is positioned above the lower edge of the internal scraper.

72. The agricultural implement of claim 71, wherein the plurality of elongated members are each comprised of a rod.

73. The agricultural implement of claim 71, wherein the plurality of elongated members are each comprised of a blade.

74. The agricultural implement of claim 71, wherein the plurality of elongated members are each comprised of a bar.

75. The agricultural implement of claim 71, wherein the plurality of elongated members extend from a first end to a second end of the rolling basket.

76. The agricultural implement of claim 71, wherein the plurality of elongated members are parallel to the major axis of rotation of the rolling basket.

77. The agricultural implement of claim 71, wherein the plurality of elongated members are evenly spaced around a circumference of the rolling basket at a fixed radius away from the major axis.

78. The agricultural implement of claim 71, wherein the plurality of elongated members are straight.

79. The agricultural implement of claim 71, wherein the plurality of elongated members are curved.

80. The agricultural implement of claim 71, wherein the plurality of elongated members are helical.

81. The agricultural implement of claim 71, wherein the internal scraper extends along an axis which is offset with respect to the major axis of rotation of the rolling basket.

82. The agricultural implement of claim 71, wherein the rolling basket comprises a first end and a second end, wherein the internal scraper is connected between the first end and the second end of the rolling basket.

83. The agricultural implement of claim 71, wherein the rolling basket comprises a first end and a second end, wherein the internal scraper extends between the first end and the second end of the rolling basket.

84. The agricultural implement of claim 71, further comprising a first sleeve connecting the internal scraper to a first support arm and a second sleeve connecting the internal scraper to a second support arm such that the internal scraper does not rotate with the rolling basket.

85. The agricultural implement of claim 71, wherein a first end of the rolling basket comprises a first outer ring plate and wherein a second end of the rolling basket comprises a second outer ring plate, and including a first bearing connected between the first support arm and the first outer ring plate and a second bearing connected between the second support arm and the second outer ring plate.

86. The agricultural implement of claim 71, wherein the internal scraper comprises a first sleeve positioned at a first end of the internal scraper and a second sleeve positioned at a second end of the internal scraper for connecting the internal scraper to the rolling basket in a non-rotational manner.

87. The agricultural implement of claim 86, wherein the internal scraper extends upwardly from the first sleeve and the second sleeve.

88. The agricultural implement of claim 71, wherein the upper edge of the internal scraper is positioned near an inner edge of the plurality of elongated members.

89. The agricultural implement of claim 71, wherein the internal scraper extends radially away from the major axis of rotation.

90. The agricultural implement of claim 71, wherein the internal scraper extends vertically.

91. The agricultural implement of claim 71, wherein the internal scraper is comprised of a stationary blade.

92. The agricultural implement of claim 71, wherein the rolling basket is connected to a pair of support arms.

93. The agricultural implement of claim 92, including a pair of bearings connected to the rolling basket and the pair of support arms.

94. The agricultural implement of claim 92, wherein the internal scraper is connected to the support arms and held stationary with respect to the plurality of elongated members.

95. An agricultural implement, comprising:
- a rolling basket comprising a plurality of elongated members, wherein the rolling basket is adapted to rotate around a major axis of rotation of the rolling basket, wherein the plurality of elongated members define an inner chamber of the rolling basket;
- wherein the plurality of elongated members are each comprised of a blade;
- wherein the plurality of elongated members extend from a first end to a second end of the rolling basket; and
- an internal scraper disposed in the inner chamber of the rolling basket adapted for breaking up a material from the inner chamber as the rolling basket is rotated around the major axis of rotation of the rolling basket, wherein the internal scraper is stationary relative to the rolling basket as the rolling basket rotates;
- wherein the rolling basket comprises a first end and a second end, wherein the internal scraper extends between the first end and the second end of the rolling basket;
- wherein the internal scraper includes an upper edge and a lower edge;
- wherein the internal scraper does not extend downwardly;
- wherein the upper edge of the internal scraper is distally spaced away from the major axis of rotation of the rolling basket;
- wherein the upper edge of the internal scraper is positioned above the major axis of rotation of the rolling basket;
- wherein the lower edge of the internal scraper is distally spaced away from the major axis of rotation of the rolling basket;
- wherein the lower edge of the internal scraper is positioned above the major axis of rotation of the rolling basket; and
- wherein the upper edge of the internal scraper is positioned above the lower edge of the internal scraper.

96. The agricultural implement of claim 95, wherein the internal scraper extends along an axis which is offset with respect to the major axis of rotation of the rolling basket.

97. The agricultural implement of claim 95, further comprising a first sleeve connecting the internal scraper to a first support arm and a second sleeve connecting the internal scraper to a second support arm such that the internal scraper does not rotate with the rolling basket.

98. The agricultural implement of claim 95, wherein a first end of the rolling basket comprises a first outer ring plate and wherein a second end of the rolling basket comprises a second outer ring plate, and including a first bearing connected between the first support arm and the first outer ring plate and a second bearing connected between the second support arm and the second outer ring plate.

99. The agricultural implement of claim 95, wherein the upper edge of the internal scraper is positioned near an inner edge of the plurality of elongated members.

100. The agricultural implement of claim 95, wherein the internal scraper extends radially away from the major axis of rotation.

101. The agricultural implement of claim 95, wherein the internal scraper extends vertically.

102. The agricultural implement of claim 95, wherein the internal scraper is comprised of a stationary blade.

103. The agricultural implement of claim 95, wherein the rolling basket is connected to a pair of support arms, wherein the internal scraper is connected to the support arms and held stationary with respect to the plurality of elongated members.

\* \* \* \* \*